Figure 1:
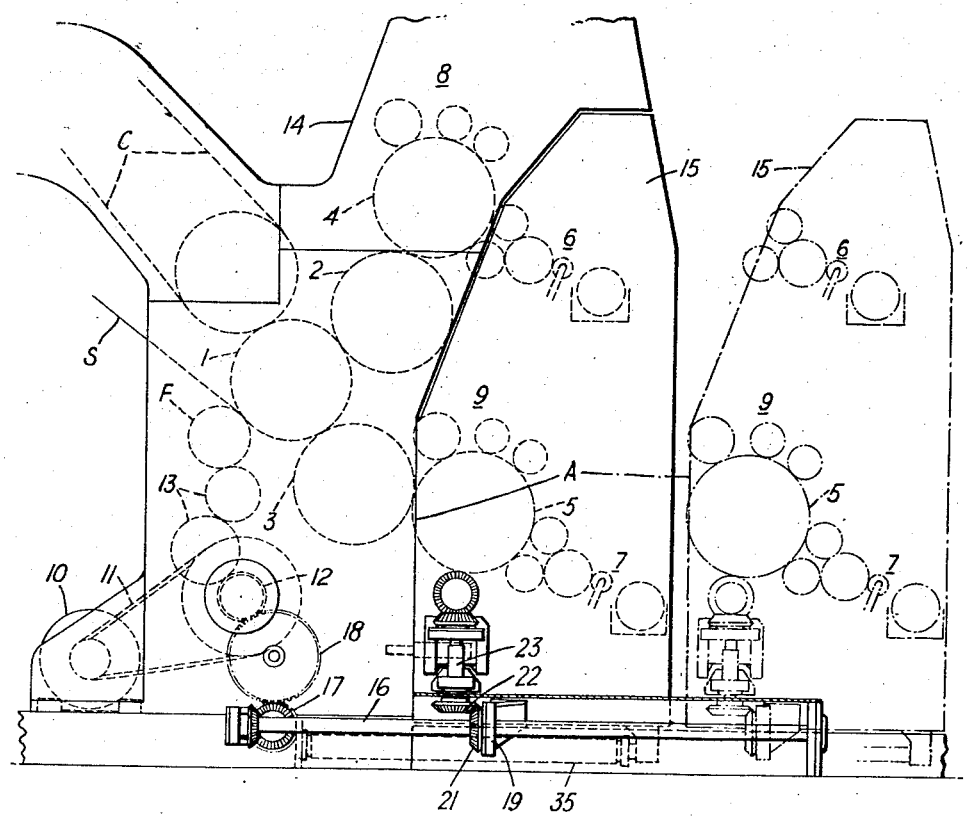

Dec. 30, 1958   D. A. STEVENSON   2,866,408
TRANSMISSION DEVICE FOR ROTARY PRINTING MACHINES
Filed Sept. 26, 1955   3 Sheets-Sheet 1

INVENTOR:
Derek Anthony Stevenson
BY:
Baldwin & Wight
ATTORNEYS

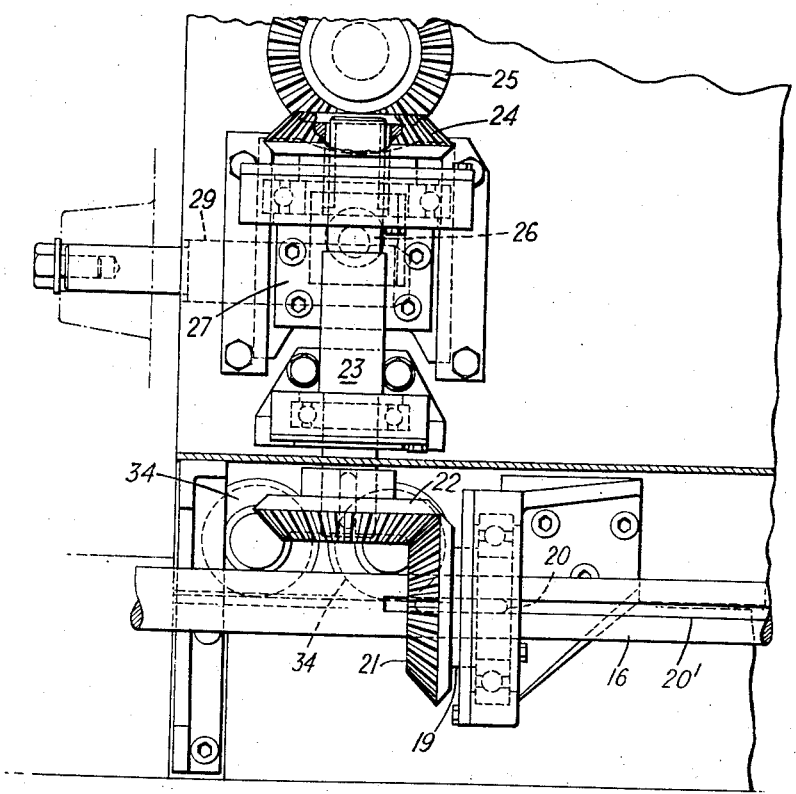
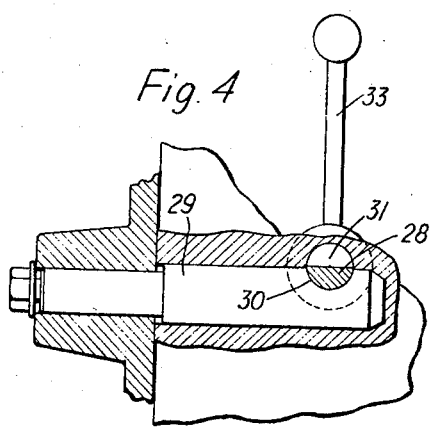

Dec. 30, 1958  D. A. STEVENSON  2,866,408
TRANSMISSION DEVICE FOR ROTARY PRINTING MACHINES
Filed Sept. 26, 1955  3 Sheets-Sheet 3

INVENTOR:
Derek Anthony Stevenson
BY:
Baldwin + Wight
ATTORNEYS

United States Patent Office 2,866,408
Patented Dec. 30, 1958

2,866,408

TRANSMISSION DEVICE FOR ROTARY PRINTING MACHINES

Derek A. Stevenson, Leeds, England, assignor to R. W. Crabtree & Sons Limited, Leeds, England Application September 26, 1955, Serial No. 536,608

Claims priority, application Great Britain October 1, 1954

10 Claims. (Cl. 101—219)

This invention relates to printing machines and more particularly to machines of the rotary cylinder type in which one part of the machine frame with its cylinder (or cylinders) and the associated parts such as the inking roller, moistening roller mechanism, guide rollers and so on, is movable relatively to another machine frame part with its own cylinder (or cylinders) and associated parts: the purpose of such an arrangement is to enable the frame parts to be separated to provide an aisle space affording an operator convenient access to the parts so exposed.

The various cylinders of a printing machine have of course a predetermined angular relationship which is maintained when the frame parts are in their normal position by the normal drive transmission comprising gearing or shafting for driving the cylinders: however in the usual arrangement of a machine of this kind, the separation of the machine frame parts "breaks" the mechanical tie by the parting of one part of the drive gearing on one frame part from the drive gearing on the other frame part, so that in returning the frame parts to their normal position it is necessary to re-set the cylinders in their proper relationship.

The main object of this invention is to enable the defect of such machines to be avoided and according to this invention each of the two relatively movable frame parts is equipped with one of two cooperating components of a supplementary transmission, these components being arranged respectively to be tied in angular relationship to the cylinders of the respective frame parts and these two components are free to move relatively to one another when the machine frame parts are moved but while remaining tied in their own angular relationship during such movement.

Preferably the supplementary transmission would be arranged so as normally to be ineffective so as not to affect the angular tie provided by the normal drive gearing when the frame parts are in their normal position. It is however desirable that this supplemenary transmission shall never be completely untied and for this purpose the transmission can be formed with a degree of "slack" which is taken up when the supplementary transmission is to be brought into action, it being understood that the slack prevents the supplementary transmission from reflecting back into the normal drive gearing any inaccuracies (such as gear tooth pitch inaccuracies) in the supplementary transmission.

The bringing of the supplementary transmission into action can be effected automatically when the frame parts are prepared for being moved away from one another; normally the frame parts are locked together by a locking device which is controlled by the machine attendant and it is proposed to employ this locking device also to render the transmission active and inactive.

The precise cylinders carried by the movable frame part would of course depend on the particular style of machine concerned.

Figure 3:
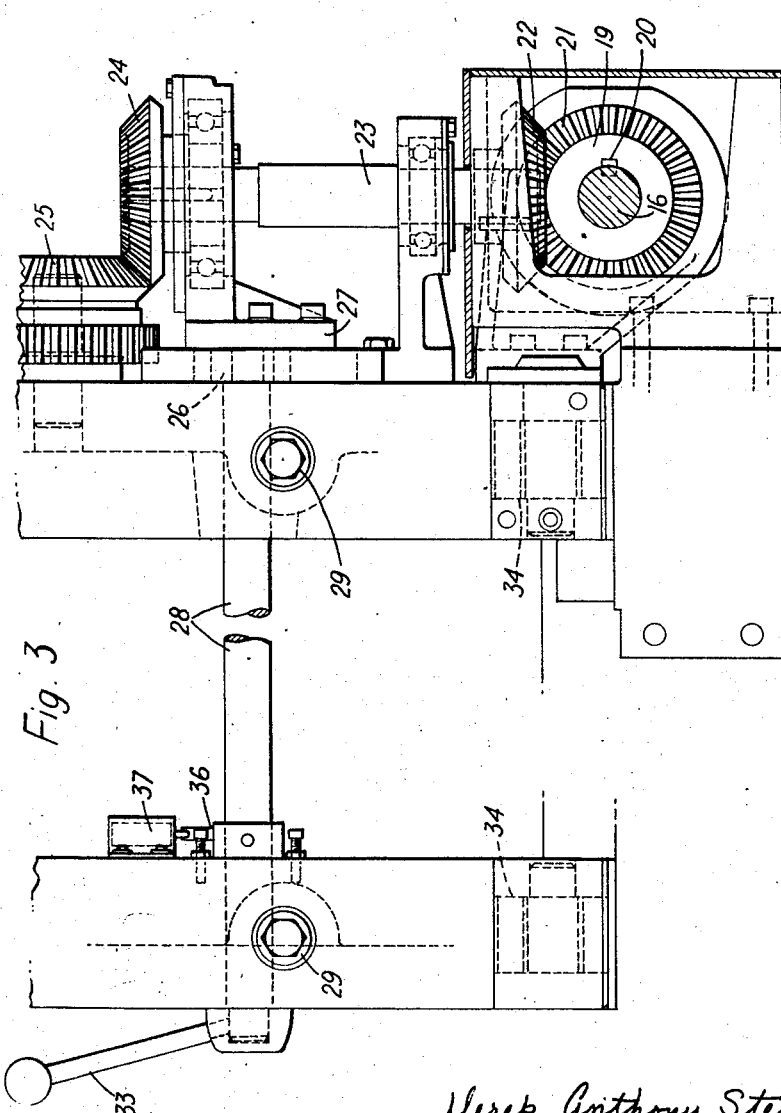

The invention is illustrated in the accompanying drawings which show the invention applied to a two colour lithographic offset printing machine. In the drawings, Figure 1 is a diagrammatic general side elevation of the machine, Figure 2 a local side elevation of a part of the machine, Figure 3 a sectional plan of the parts shown in Figure 2, and Figure 4 a detail view.

Referring firstly to Figure 1, the machine shown comprises an impression cylinder 1 having grouped about its periphery two blanket cylinders 2, 3 which receive an impression respectively from plate cylinders 4, 5 the impressions applied to the blankets being transferred in succession to sheets S which are fed by a feed cylinder F to the impression cylinder 1. The sheets, after receiving the impressions are taken from the impression cylinder 1 by grippers on a chain conveyor C which conveys the sheets to a delivery (not shown) or to a further printing unit for further treatment. The plates on the plate cylinders 4, 5 are moistened and are inked in the respective colours respectively by moistening mechanisms 6, 7 and inking mechanisms 8, 9.

Such a machine and its operation is well known in itself and further description is therefore believed to be unnecessary.

As is also usual in such machines, drive is imparted to the various cylinders as for example by an electric motor 10 which transmits drive through a chain 11 to a gear wheel 12 which through gears 13 transmits drive to gears on the various cylinders which are geared together and to the moistening and inking mechanisms 6, 7, 8, 9 the gear connections holding the various parts in their proper angular relationship.

Now in accordance with this invention to provide access to the surfaces of the various cylinders and to the moistening and inking mechanisms some of the components, e. g. cylinders (as shown the cylinders 1—4) are mounted as a set in bearings on one frame part 14 while another set of components, e. g. another cylinder or cylinders (as shown the plate cylinder 5) is mounted on another frame part 15. This frame part 15 also carries the moistening and inking mechanisms 7 and 9 for the cylinder 5 and also the moistening mechanism for the cylinder 4. These two frame parts 14, 15 can be relatively separated, as shown by arranging the part 15 to be moved to the dotted line position shown in Figure 1: by this means the cylinder 5 is moved away from the other cylinders to provide an aisle space indicated at A by which access to all the cylinders and their moistening and inking mechanisms can be gained.

The movement of the frame part 15 would cause the tie between the various cylinders which is provided by the gear connections between them to be broken.

However, in carrying out this invention that defect is avoided. Thus in the particular construction shown in the drawings, the parts (i. e. the cylinder 5 and its moistening and inking mechanisms 7, 9 and the moistening mechanism 6 for the cylinder 4) on the movable part 14 of the frame, are additionally coupled to the parts (i. e. the other cylinders 1—4 and the associated moistening and inking mechanisms) by what may be termed a supplementary transmission which allows the cylinders to be moved apart while maintaining their angular relationship.

In the particular arrangement shown in the drawings this additional coupling is afforded on the one hand by a shaft 16 which is permanently geared to the parts on the frame part 14 by gearings 17 and 18 and on the other hand by a sleeve 19 which is geared to the parts on the frame part 15: in addition the sleeve 19 while being slidable longitudinally on the shaft 16 is tied angularly to it and hence to the parts on the frame part 14 by a key 20 on the sleeve engaged in a key-way 20' in the shaft 16.

In the particular arrangement shown, the sleeve 19 is coupled to the parts on the movable frame part 15 through bevel gears 21 and 22, a vertical shaft 23 and other bevel gears 24, 25 of which the gear 25 is fast with the cylinder 5. It will be clear that, even when the frame parts 14, 15 are separated, as is permitted by the key connection between the shaft 16 and the sleeve 19, any angular movement of the parts on one frame part is transmitted to the parts on the other frame part, i. e. the parts always maintain their angular relationship.

It is preferred as is shown in the drawings that this supplementary transmission shall be ineffective when the frame parts 14, 15 are in their normal position so as not to affect the tie provided by the normal gear transmission between the parts on the separable frame parts 14, 15 of the machine.

For this purpose the bevel gear 24 is arranged to move axially of its shaft 23 so as to move to and from mesh with the bevel gear 25. The movement of the gear 24 is effected by a device which is provided to lock the two frame parts 14, 15 when in their normal position or to unlock them from one another when they are required to be bodily separated, the action of the device in moving to its unlocking position being to move the gears 24, 25 into full mesh.

In the arrangement shown, this movement of the bevel gear 24 is effected by an eccentric cam 26 which engages a slide 27 in which the gear is rotatably mounted, the cam 26 being mounted on a shaft 28.

The locking device is constituted in the arrangement shown, by a pin 29 carried by the fixed frame part 14 and extending therefrom to enter an opening in the movable frame part 15: the pin 29 has a cylindrical recess 30 which, when the frame parts are together, registers with the shaft 28 which itself has a cut-away part 31. When the shaft 28 is in the position shown in Figure 4 it, and hence the frame 15 is locked to the pin 29 and hence to the fixed frame part 14: it is only when the shaft 29 is turned to bring its cut away part 31 into register with the pin 29 that the frame part 15 is unlocked from the frame part 14. The shaft 29 is provided with a lock operating hand lever 33.

While it is desired that the gear 24 shall be sufficiently moved out of mesh to prevent any pitch inaccuracies in the supplementary transmission from being reflected back into the normal gear transmission when the frame parts 14, 15 are locked together, it is preferable not to move the gears 24 and 25 completely out of mesh but only partly so: by this means the gears always remain in "interference" relationship so as to prevent an inadvertent complete break in the tie in the angular relationship of the parts of the machine at any time. For this reason the "throw" of the cam 26 is selected so as to move the gear 24 from a position of full depth mesh with the gear 25 only to a position of partial depth mesh.

The movable frame part 15 could be carried by rollers 34 running on a base-plate: it could be arranged for movement under power and preferably by a double acting hydraulic ram and cylinder arrangement 35 acting and reacting between the frame parts 14, 15. The frame part or parts would usually be provided with a platform for the convenience of the operator and provision would be made (as by a loose floor to the platform) to prevent the power supply from being established so long as an operator (or indeed any article) is on the platform and hence liable to be trapped if the frames were relatively moved back under power.

In order to prevent damage to the machine by the power-operation of the movable part 15 when the shaft 28 is in "locked" position, the shaft is provided with an operating cam 36 which controls a micro-switch 37 governing the supply of hydraulic pressure to the ram and cylinder 35.

A machine according to this invention can incorporate the invention described in the co-pending United States application of Harold Maitland Taylor and Derek Anthony Stevenson, Serial No. 536,642, filed September 26, 1955, the hydraulic operation required for the movement of the movable frame being effected by hydraulic power drawn from the supply required for hydraulic operation referred to in that other application.

I claim:

1. A rotary printing machine comprising two separate frame parts normally positioned relatively close to each other but being bodily separable, a first set of rotary printing machine components carried by one of said frame parts, a second set of rotary printing machine components carried by the other of said frame parts, a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, and a supplementary transmission to hold the components of said sets of components in the predetermined relationship in all positions of separation of the frame parts when the normal transmission hold is interrupted.

2. A rotary printing machine comprising two separate frame parts normally positioned relatively close to each other but being bodily separable, a first set of rotary printing machine components carried by one of said frame parts, a second set of rotary printing machine components carried by the other of said frame parts, a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, a normally inactive supplementary transmission to hold all the components of said sets of components in the predetermined relationship in all positions of separation of the frame parts when the normal transmission hold is interrupted, and means to render the supplementary transmission active when the frame parts are prepared for separation.

3. A rotary printing machine comprising two separate frame parts normally positioned relatively close to each other but being bodily separable, a first set of rotary printing machine components carried by one of said frame parts, a second set of rotary printing machine components carried by the other of said frame parts, a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, a supplementary transmission to hold all the components of said sets of components in the predetermined relationship in all positions of the frame parts, the supplementary transmission having two settings one of which is an inactive setting providing a degree of slack in the hold and the other of which is the active setting in which the slack is taken up, and means to set the supplementary transmission into the active setting to enable it to replace the holding action of the normal transmission when the frame parts are to be separated.

4. A rotary printing machine comprising two separate frame parts normally positioned relatively close to each other but being bodily separable, a first set of rotary printing machine components carried by one of said frame parts, a second set of rotary printing machine components carried by the other of said frame parts, a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, a normally inactive supplementary transmission to hold all the components of said sets of components in the predetermined relationship in all positions of separation of the frame parts when the normal transmission hold in interrupted, and means to render the supplementary transmission active when the frame parts are prepared for separation comprising a device to latch and unlatch the frame parts.

5. A rotary printing machine comprising two separate frame parts normally positioned relatively close to each other but being bodily separable, a first set of rotary printing components carried by one of said frame parts, a second set of rotary printing machine components carried by the other of said frame parts, and a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, a supplementary transmission to hold all of the components of said sets of components in the predetermined relationship in all positions of the frame parts, the supplementary transmission having two settings one of which is an inactive setting providing a degree of slack in the hold and the other of which is the active setting in which the slack is taken up, and means to set the supplementary transmission into the active setting to enable it to replace the holding action of the normal transmission when the farme parts are to be separated comprising a device to latch and unlatch the frame parts.

6. A rotary printing machine comprising two separte frame parts normally positioned relatively close to each other but being bodily separable, a first set of rotary printing machine components carried by one of said frame parts, a second set of rotary printing machine components carried by the other of said frame parts, a normal drive transmission including a gear on one of said frame parts and permanently held in predetermined relationship to the set of components on that frame part and including also a gear on the other of said frame parts and permanently held in predetermined relationship with the components on that other frame part, the said two gears being in mesh when said frame parts are in their normal relative positions, close to each other and being mobvable out of mesh when the frame parts are bodily separated, and a supplementary transmission comprising two members, one permanently held to the gear on one of said frame parts and the other arranged to be held to the gear on the other of said frame parts, the two members being in slidable relationship to accommodate the movement of the frame parts but in fixed angular relationship to maintain the hold in all positions of separation of the frame parts.

7. A machine as claimed in claim 6 wherein the other member of the supplementary transmission is permanently held to the parts on the other frame part through a device providing a degree of slack in the hold, said device being operable to take up the slack when the frame parts are to be separated.

8. A machine as claimed in claim 6 wherein one member of the supplementary transmission comprises a shaft extending in the direction of separation between the frame parts geared to the rotary parts on one frame part, and the other member of the supplementary transmission comprises a sleeve non-rotatable but slidable on the shaft and geared to the rotary parts on the other frame part.

9. A rotary printing machine comprising two separate frame parts normally positioned relatively close to each other but being bodily separable, a first set of rotary printing machine components carried by one of said frame parts, a second set of rotary printing machine components carried by the other of said frame parts, a normal drive transmission comprising parts on each of said frame parts and normally holding the various components of said first and second sets of components in a predetermined relationship when said frame parts are in their normal relative positions, close to each other, said normal drive transmission being interrupted when said frame parts are bodily separated, and a supplementary transmission holding all the components on the frame parts in the predetermined relationship in all positions of separation of the frame parts, the said supplementary transmission including two intermeshing gears and means to move the gears from an active setting of full mesh to an inactive setting of partial mesh to avoid interference with the hold exercised by the normal transmission when the frame parts are together.

10. A rotary printing machine comprising first and second frame parts normally positioned relatively close to each other but being bodily separable, a first set of rotary printing machine components carried by the first frame part, a second set of rotary printing machine components carried by the second frame part, a normal drive transmission comprising parts on each frame part normally holding the various components of said first and second sets of components in a predetermined relationship, a shaft extending parallel to the direction of separating movement of said frame parts and crossing the line of separation of said frame parts, means to drive said transmission shaft from an element of said normal drive transmission on said first frame part, a mounting member on said second frame part, said mounting member being slidable longitudinally on said transmission shaft, a gear carried by and slidable with said mounting member and rotatable with said shaft, driving gear mechanism carried by said second frame part to operate one of said components on the second frame part from said gear, said driving gear mechanism including gear members, and means operable to impart demeshing movement to one of said gear members relatively to the other gear member.

References Cited in the file of this patent

UNITED STATES PATENTS

| | | |
|---|---|---|
| 942,923 | Pancoast | Dec. 14, 1909 |
| 2,003,799 | Barber | June 4, 1935 |
| 2,542,073 | Aberle | Feb. 20, 1951 |
| 2,557,381 | Huebner | June 19, 1951 |